United States Patent
Laha et al.

(10) Patent No.: US 11,323,979 B2
(45) Date of Patent: May 3, 2022

(54) BROADCASTING OR MULTICASTING TO USER EQUIPMENT THAT USE EXTENDED IDLE MODE DISCONTINUOUS RECEPTION

(71) Applicant: Alcatel Lucent, Boulogne-Billancourt (FR)

(72) Inventors: Subhasis Laha, Aurora, IL (US); Padmavathi Sudarsan, Naperville, IL (US); Ranga Tota, Naperville, IL (US); Ruth Gayde, Naperville, IL (US); Subramanian Vasudevan, Morristown, NJ (US)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 15/232,455

(22) Filed: Aug. 9, 2016

(65) Prior Publication Data

US 2018/0049156 A1  Feb. 15, 2018

(51) Int. Cl.
*H04W 52/02* (2009.01)
*H04W 68/02* (2009.01)
(Continued)

(52) U.S. Cl.
CPC ......... *H04W 68/02* (2013.01); *H04L 12/1881* (2013.01); *H04W 4/06* (2013.01);
(Continued)

(58) Field of Classification Search
None
See application file for complete search history.

(56) References Cited

U.S. PATENT DOCUMENTS

| 6,728,300 B1* | 4/2004 | Sarkar | H04W 68/025 |
| | | | 375/147 |
| 7,197,323 B2* | 3/2007 | Terry | H04W 68/00 |
| | | | 455/458 |

(Continued)

FOREIGN PATENT DOCUMENTS

| CN | 101415147 A | 4/2009 |
| CN | 101521656 A | 9/2009 |

(Continued)

OTHER PUBLICATIONS

"General Packet Radio Service (GPRO) enhancements for Evolved Universial Terrestrial Radio Acess Network (E-UTRAN) access", 3GPP TS 23.401 Version 14.0.0 Release 14, Jun. 2016, 374 pages.

(Continued)

*Primary Examiner* — Willie J Daniel, Jr.
(74) *Attorney, Agent, or Firm* — Tong, Rea, Bentley & Kim, LLC

(57) ABSTRACT

A broadcast manager identifies a time interval that encompasses paging windows for a plurality of user equipment. The plurality of user equipment operate according to a plurality of discontinuous reception cycles that include sleep intervals separated by the paging windows. The broadcast manager generates messages for wireless transmission to the plurality of user equipment in corresponding paging windows during the time interval. The messages include information indicating a transmission time at which the plurality of user equipment are to receive broadcast or multicast data. The transmission time is subsequent to the time interval.

11 Claims, 6 Drawing Sheets

(51) Int. Cl.
    *H04W 76/28*    (2018.01)
    *H04L 12/18*    (2006.01)
    *H04W 4/06*     (2009.01)
    *H04W 68/00*    (2009.01)
    *H04W 4/70*     (2018.01)

(52) U.S. Cl.
    CPC ... *H04W 52/0216* (2013.01); *H04W 52/0219* (2013.01); *H04W 68/005* (2013.01); *H04W 76/28* (2018.02); *H04L 12/189* (2013.01); *H04W 4/70* (2018.02); *Y02D 30/70* (2020.08)

(56) References Cited

U.S. PATENT DOCUMENTS

| | | | |
|---|---|---|---|
| 8,588,155 | B2 | 11/2013 | Lee et al. |
| 2011/0032860 | A1 | 2/2011 | Kojima |
| 2019/0116483 | A1* | 4/2019 | Ryu ..................... H04W 76/12 |

FOREIGN PATENT DOCUMENTS

| | | | |
|---|---|---|---|
| CN | 101611640 A | 12/2009 | |
| CN | 101836376 A | 9/2010 | |
| CN | 105409307 A | 3/2016 | |

OTHER PUBLICATIONS

"Architecture enhancements to facilitate communications with packet data networks and applications", 3GPP TS 23.682 Version 14.0.0 Release 14, Jun. 2016, 91 pages.

"Mobility Management Entity (MME) and Serving GPRS Support Node (SGSN) interfaces for interworking with packet data networks and applications", 3GPP TS 29.128 Version 13.1.0 Release 13, Jun. 2016, 45 pages.

"Group Communication System Enablers for LTE (GCSE_LTE)", 3GPP TS 29.468 Version 13.1.0 Release 13, Jun. 2016, 34 pages.

Office Action dated Oct. 26, 2020 for European Patent Application No. 17745181.2, 5 pages.

Chinese Office Action mailed in Corresponding CN201780047481.3, dated May 17, 2021, 6 pages.

Indian Office Action mailed in corresponding IN 201947004271 dated Apr. 13, 2021, 6 pages.

European Office Action mailed in corresponding EP 17 745 181.2 dated Apr. 16, 2021, 5 pages.

Office Action dated Nov. 26, 2020 for Chinese Patent Application No. 201780047481.3, 10 pages.

European Office Action mailed in corresponding EP 17 745 181.2 dated Sep. 1, 2021, 9 pages.

Chinese Office Action mailed in corresponding CN 201780047481.3 dated Jan. 27, 2022, 10 pages.

* cited by examiner

BROADCASTING OR MULTICASTING TO USER EQUIPMENT THAT USE EXTENDED IDLE MODE DISCONTINUOUS RECEPTION

BACKGROUND

Field of the Disclosure

The present disclosure relates generally to wireless communication systems and, more particularly, to supporting discontinuous reception by user equipment in wireless communication systems.

Description of the Related Art

The Internet of Things (IoT) includes physical entities with embedded electronics, software, sensors, and network connectivity that enable the entities to collect and exchange data, as well as being sensed and controlled remotely across the network infrastructure. Many of the physical entities that make up the IoT (these entities are referred to herein as user equipment) are powered by batteries that are required to have a lifetime on the order of 10-20 years. Consequently, user equipment in the IoT typically implement power savings techniques including extended idle mode discontinuous reception (eDRX) that allows the user equipment to cycle between a sleep mode in which the user equipment cannot receive transmissions and a paging window in which the user equipment wakes up to listen for paging messages transmitted by the network. The duration of the paging window is configurable on a per-user equipment basis and can range from 1.28 seconds to 40.96 seconds for devices that operate according to current standards. The duration of the sleep mode (the sleep interval or eDRX cycle duration) is configurable on a per-user equipment basis and can range from 5.12 seconds to 10485.76 seconds for devices that operate according to current standards. Thus, the durations of the eDRX cycles can be different for different user equipment. Furthermore, user equipment can begin their eDRX cycles at different times so that user equipment that share the same eDRX cycle duration can enter and exit the sleep mode at different times. At least in part because of the potentially long and variable durations of the sleep mode, user equipment in the IoT that utilize eDRX for power savings are typically associated with applications that are delay tolerant and used by large numbers of user equipment.

SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided that includes identifying, at a broadcast manager, a first time interval that encompasses paging windows for a plurality of user equipment. The plurality of user equipment operate according to a plurality of discontinuous reception cycles that include sleep intervals separated by the paging windows. The method also includes generating, at the broadcast manager, messages for wireless transmission to the plurality of user equipment in corresponding paging windows during the first time interval. The messages include information indicating a transmission time at which the plurality of user equipment are to receive at least one of broadcast and multicast data. The transmission time is subsequent to the first time interval. Some embodiments of a non-transitory computer readable medium embody a set of executable instructions to manipulate at least one processor perform the method.

In some embodiments, a method is provided that includes receiving, at a server, a message including information indicating a transmission time to perform at least one of broadcasting or multicasting data to a plurality of user equipment. The transmission time is subsequent to a first time interval that encompasses paging windows for the plurality of user equipment. The plurality of user equipment operate according to a plurality of discontinuous reception cycles that include sleep intervals separated by the paging windows. The method also includes transmitting, from the server to a broadcast/multicast server, a request to perform at least one of broadcasting or multicasting the data to the plurality of user equipment at the transmission time.

In some embodiments, a method is provided that includes receiving, at a user equipment during a paging window in a discontinuous reception cycle that includes sleep intervals separated by paging windows, a message including information indicating a transmission time at which the user equipment is to receive at least one of broadcast or multicast data. The user equipment is one of a plurality of user equipment that operate according to a plurality of discontinuous reception cycles and the transmission time is subsequent to a time interval that encompasses paging windows for the plurality of user equipment. The method also includes waking up the user equipment from a sleep interval prior to the transmission time and receiving, at the user equipment, at least one of broadcast or multicast data beginning at the transmission time.

In some embodiments, a user equipment is provided that includes a transceiver to receive, during a paging window in a discontinuous reception cycle that includes sleep intervals separated by paging windows, a message including information indicating a transmission time at which the user equipment is to receive at least one of broadcast or multicast data. The user equipment is one of a plurality of user equipment that operate according to a plurality of discontinuous reception cycles and the transmission time is subsequent to a time interval that encompasses paging windows for the plurality of user equipment. The user equipment also includes a processor and a non-transitory computer readable medium embodying a set of executable instructions, the set of executable instructions to manipulate the processor to wake up the user equipment from a sleep interval prior to the transmission time so that the transceiver is able to receive at least one of broadcast or multicast data beginning at the transmission time.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
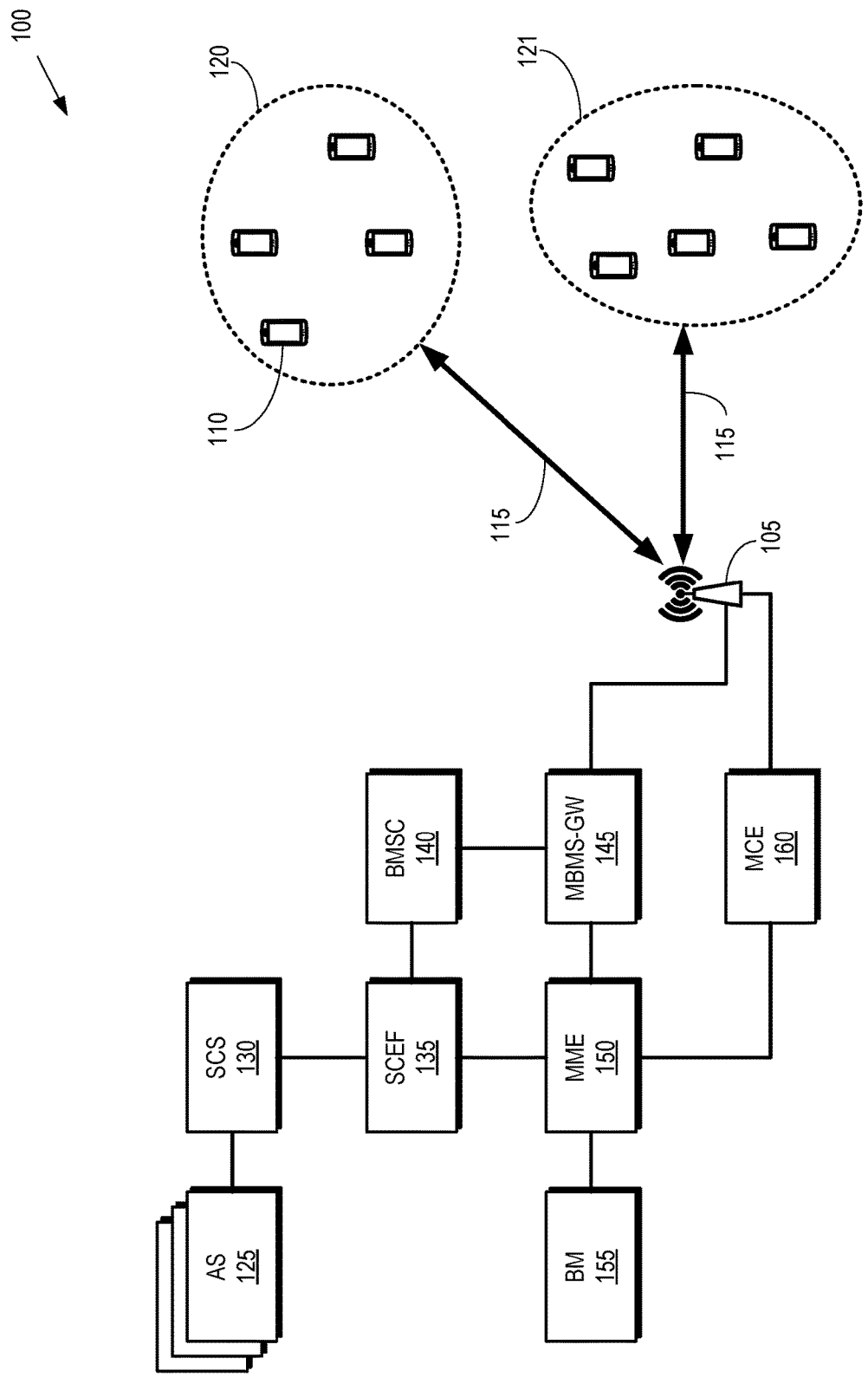
FIG. 1 is a block diagram of a wireless communication system according to some embodiments.

Logical groupings of user equipment typically share the same configuration information, such as firmware or software updates that are received from the network over the air. For example, a set of smart water meters deployed in homes in a neighborhood can be configured as a logical grouping of user equipment that are accessible by application servers for tasks such as configuring the smart water meters. The same software or firmware updates are used to configure (or upgrade) the smart water meters in the neighborhood. Application servers can also provide the same queries to retrieve information from all user equipment in a logical grouping. For example, the local water department can trigger remote meter readings by transmitting the same requests to the water meters in the neighborhood.

One-to-one transmission techniques (such as unicasting) can be used to transmit copies of the same information to all the user equipment in a logical grouping. However, unicasting information such as software or firmware upgrades requires significant system resources, which increase in proportion to the number of user equipment. For example, some user equipment in the IoT require firmware or software upgrades that range in size from hundreds of kilobytes to many megabytes of information. Moreover, replicating the downlink information in multiple unicast requests incurs the overhead of setting up and maintaining the necessary packet data network (PDN) connections, which may take several hours for large numbers of user equipment.

One-to-many transmission techniques (such as multicasting or broadcasting) can be used to notify the user equipment of an upcoming broadcast so that the user equipment can receive the broadcast information. However, multicasting or broadcasting the notification to user equipment that implement eDRX is inefficient because the paging windows of the user equipment do not necessarily overlap and can be distributed over eDRX cycles that range in duration up to several hours. The notification would therefore need to be multicast or broadcast continuously for the longest eDRX cycle of any of the user equipment to guarantee that all the user equipment receive the notification. The notifications could be unicast between an application server and the user equipment, but conventional application servers and services capability servers (SCSs) are not able to determine whether user equipment are operating in the eDRX mode. Knowledge of the eDRX status of the user equipment would therefore need to be exposed to all upstream application servers, which are expected to include multiple application types, different industries, and the like. Multicasting or broadcasting information to user equipment that are not operating in the eDRX mode typically requires additional complex functionality on the application servers and SCSs.

Information can be efficiently transmitted to a logical grouping of user equipment that includes one or more user equipment operating in a discontinuous reception (eDRX) mode by identifying a time interval that encompasses paging windows for the user equipment that are operating in the eDRX mode and transmitting messages to the user equipment in corresponding paging windows during the time interval. The messages include information indicating a transmission time at which the user equipment are to wake up to receive information that is broadcast or multicast over the air to the user equipment. The transmission time is subsequent to the time interval. In some variations, the transmission time is set based on a duration of a longest eDRX cycle among the user equipment. In other variations, the transmission time is set based on an amount of time that will elapse before a latest paging window from among the user equipment.

The transmission time can be indicated using a clock time, e.g., the multicast or broadcast transmission occurs at 12:01:01 on a specified date. The transmission time can also be indicated by a relative time. For example, messages transmitted to different user equipment in their corresponding paging windows can indicate different waiting time intervals relative to the paging windows. The waiting time intervals are defined such that the sum of the paging window time and the waiting time interval for each user equipment is equal to the transmission time. Consequently, all the user equipment that receive the messages including waiting time intervals wake up at the same transmission time even though they receive the messages in different paging windows. In some variations, the waiting time interval includes an additional offset to shift the transmission time to a later time relative to the paging windows. The logical grouping can be divided into multiple subgroups of user equipment (e.g., by geographic region) that are scheduled to wake up to receive multicast or broadcast information at different transmission times.

FIG. 1 is a block diagram of a wireless communication system 100 according to some embodiments. The wireless communication system 100 includes one or more base stations 105 that provide wireless connectivity according to one or more radio access technologies such as cellular communication according to the Long Term Evolution (LTE) standards defined by the Third Generation Partnership Project (3GPP). The base station 105 provides wireless connectivity to a plurality of user equipment 110 (only one indicated by a reference numeral in the interest of clarity) over one or more air interfaces 115. As used herein, the term "user equipment" refers to wireless-enabled devices that are able to receive information over a downlink of the air interface 115 and transmit information over an uplink of the air interface 115. The term "user equipment" can therefore refer to devices such as network interface cards, cellular telephones, smart phones, wireless-enabled tablets, and the like. The term "user equipment" also refers to wireless-enabled devices such as sensors, cameras, and devices that are embedded in other entities such as medical devices, wearable electronics, household appliances, alarm systems, automobiles or other vehicles, buildings, transport infrastructure, energy infrastructure, utility infrastructure, and the like. For example, the user equipment 110 can be configured to operate as part of the Internet of Things (IoT) by configuring the user equipment to operate according to wireless communication standards such as the narrowband IoT standards that define a narrowband radio access technology with a focus on indoor coverage, low-cost, long battery life, and a large number of devices.

Some embodiments of the user equipment 110 implement power saving modes such as extended discontinuous reception (eDRX), which allows each of the user equipment 110 to operate in alternating sleep intervals and paging windows that are referred to as an eDRX cycle. For example, each of the user equipment 110 is able to sleep for a configurable interval of time and periodically wake up during a paging window to receive paging messages from the network. The duration of the paging window is also configurable on a per-user equipment basis for each of the user equipment 110. The duration of the sleep interval can be chosen from among standardized time intervals, e.g. time intervals within a range from 5.12 seconds (s) to 2621.44 s. User equipment 110 that operate according to the narrow band IoT (NB-IoT) standards can also select from among additional durations such as sleep intervals of 5242.88 s and 10485.76 s. The duration of the paging window can be configured within a range from 1.28 s to 20.48 seconds for non NB-IoT devices and within a range from 2.56 s to 40.96 s for NB-IoT devices. The NB-IoT standards use narrowband radio technology to support indoor coverage, low-cost, long battery life, and a large number of devices.

The user equipment 110 shown in FIG. 1 are part of a logical grouping that is indicated by a group identifier. Messages can therefore be transmitted to the user equipment 110 using one-to-many techniques based on the group identifier. For example, the group identifier can be used to identify the user equipment 110 in the group so that messages can be broadcast or multicast to the user equipment 110. The group of user equipment 110 can also be divided into subsets 120, 121. Data can be broadcast or multicast to the subsets 120, 121 at different time intervals, as discussed herein. In some variations, the user equipment 110 in the subsets 120, 121 are identified by different group identifiers or subset identifiers.

The wireless communication system 100 is configured to provide one-to-many transmission of data such as broadcasting or multicasting data to the user equipment 110. One or more application servers 125 originate the data to be broadcast or multicast to the user equipment 110. A service capability server (SCS) 130 functions as a secure gateway between the application servers 125 and the downstream portion of the wireless communication system 100. The service capability server 130 communicates with a service capability exposure function (SCEF) 135. The SCS 130 and the SCEF 135 communicate with the user equipment 110 and are configured to securely expose the services and capabilities provided by various interfaces in the wireless communication system 100. The SCEF 135 is also configured to communicate with a broadcast multicast service center (BMSC) 140 that provides functions for multimedia broadcast multicast service (MBMS) user service initiation and delivery. The BMSC 140 communicates with an MBMS gateway 145 that is configured to broadcast MBMS packets to the base station 105 (and other base stations in the wireless communication system 100) for transmission by the base station 105.

The SCEF 135 is also configured to communicate with a mobility management entity (MME) 150 to determine whether data that is intended for broadcast or multicast can be sent using broadcast or multicast mechanisms supported by the wireless communication system, as discussed herein.

The MME 150 is a control node that is responsible for idle mode paging of the user equipment 110, as well as other functions such as retransmission of data, bearer activation/deactivation, choosing a serving gateway, and the like. The MME 150 terminates non-access stratum (NAS) signaling with the user equipment 110. As discussed herein, the MME 150 also stores or has access to information identifying the eDRX cycles and paging windows of the user equipment 110.

A broadcast manager (BM) 155 is associated with the MME 150. The broadcast manager 155 can be implemented in hardware, firmware, software, or a combination thereof. The broadcast manager 155 (as well as other entities or functions within the wireless communication system 100) can also be implemented as software for execution on a processor implemented, e.g., in a cloud server, or as a virtual function according to network function virtualization (NFV), which is a network architecture that makes use of technologies of computer virtualization, as discussed herein. The broadcast manager 155 shown in FIG. 1 is connected to the MME 150 by an interface. However, some variations of the MME 150 can implement an integrated or embedded broadcast manager, as discussed herein.

The broadcast manager 155 is configured to determine whether the user equipment 110 are operating in the eDRX mode. This determination can be performed in response to a request to broadcast or multicast data to the user equipment 110, e.g., in response to a request from an application server 125. The broadcast manager 155 is also configured to determine a transmission time at which the user equipment 110 are to wake up to receive the broadcast or multicast data and to send messages instructing the user equipment 110 to wake up prior to the transmission time. For example, the broadcast manager 155 can identify a time interval that encompasses the paging windows for the user equipment 110. The broadcast manager 155 can then generate messages for transmission to the user equipment 110 over the air interface 115 in each user equipment's paging window during first time interval. The messages generated for transmission to the user equipment 110 include information indicating the transmission time.

The wireless communication system 100 also includes a multi-cell coordination entity (MCE) 160 that allocates resources for the broadcast or multicast transmissions. In some variations, the base station 105 in the wireless communication system 100 is a part of a multimedia broadcast single frequency network (MBSFN) area. The term "MBSFN" refers to a transmission mode that utilizes an orthogonal frequency division multiplexing (OFDM) radio interface to send broadcast or multicast data as a multi-cell transmission over a synchronized single frequency network. The MCE 160 allocates resources used by the base station 105 and other base stations in the same MBSFN area. The MCE 160 is also able to configure MBSFN subframes for MBMS control information and data broadcast. The MCE 160 configures the layer 2 and layer 3 functionality in the base station 105 for MBSFN operation and determines the modulation and coding scheme (MCS) for a packet mode channel (PMCH).

Figure 2:
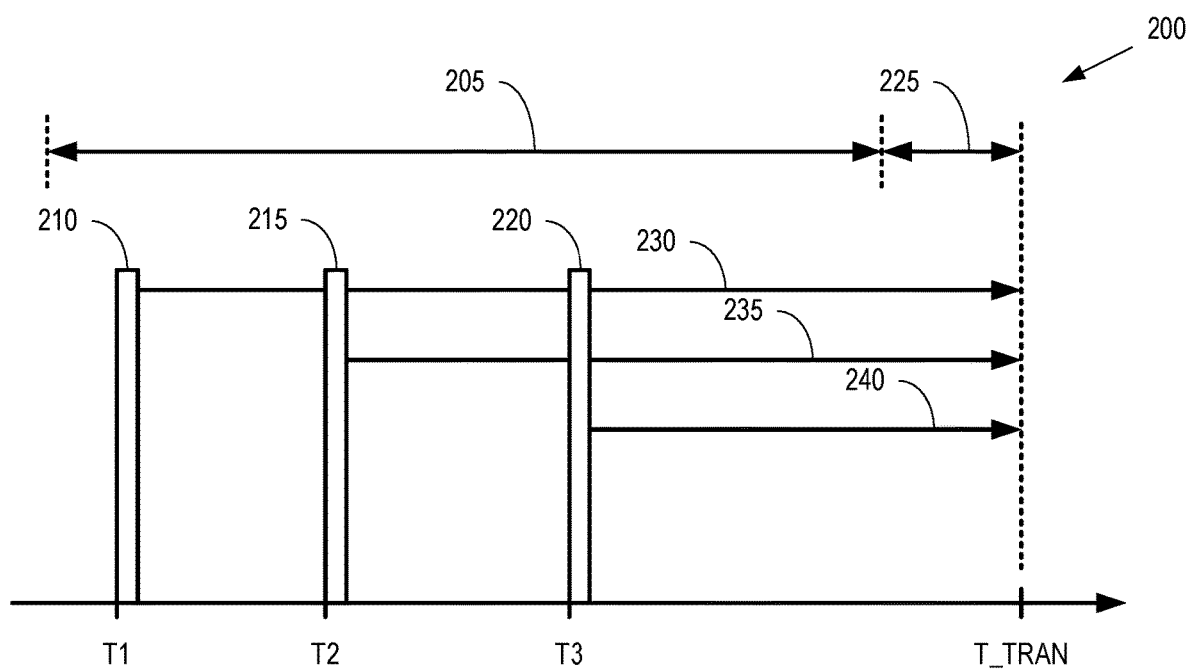
FIG. 2 is a diagram that illustrates paging windows in a time interval that corresponds to a longest discontinuous reception cycle of one of a group of user equipment according to some embodiments.

FIG. 2 is a diagram 200 that illustrates paging windows in a time interval 205 that corresponds to a longest discontinuous reception cycle of one of a group of user equipment according to some embodiments. The horizontal axis illustrates time in arbitrary units increasing from left to right. The group of user equipment includes three user equipment that have discontinuous reception cycles of different durations and different paging windows. A broadcast manager such as the broadcast manager 155 shown in FIG. 1 determines the longest discontinuous reception cycle using information stored by (or accessible to) an MME such as the MME 150 shown in FIG. 1. Setting the time interval 205 to the longest discontinuous reception cycle of the user equipment in the group of user equipment ensures that each user equipment has at least one paging window within the time interval 205.

The broadcast manager generates paging messages for transmission to all of the user equipment during their corresponding paging windows within the time interval 205. For example, the broadcast manager generates a first paging message for transmission to a first user equipment during a paging window 210 at a time T1 within the time interval 205, the broadcast manager generates a second paging message for transmission to a second user equipment during a paging window 215 at a time T2, and the broadcast manager generates a third paging message for transmission to a third user equipment during a paging window 220 at a time T3. User equipment that successfully receive the messages can respond with corresponding confirmation messages.

The paging messages transmitted to the user equipment include information that indicates a transmission time (T_TRAN) for a broadcast or multicast transmission to the user equipment. The transmission time is set to a time subsequent to the time interval 205 and, in some variations, an additional margin 225 is added to the transmission time. The additional margin can be determined based on a latency for waking up one or more of the user equipment, a time of day that is preferred for broadcast or multicast transmissions, to adjust the transmission time to a desired broadcast time, or using other criteria. The transmission time or the additional margin can be negotiated between the broadcast manager and other entities in the wireless communication system such as an SCS, an SCEF, or an application server. For example, the broadcast manager and the SCEF can negotiate a transmission time based on requirements of the broadcast or multicast data. For another example, the broadcast manager and the SCEF can negotiate whether to broadcast or multicast the data based on a number or percentage of user equipment that respond to the paging messages transmitted during the paging windows 210, 250, 220.

Some embodiments of the broadcast manager generate messages that indicate a relative time between the paging window and the transmission time. For example, the broadcast manager can generate a first message that instructs the first user equipment to wake up after a first time interval 230 that is equal to (or slightly less than) the time interval 205+the additional margin 225-T1, a second message that instructs the second user equipment to wake up after a second time interval 235 that is equal to (or slightly less than) the time interval 205+the additional margin 225-T2, and a third message that instructs the third user equipment to wake up after a third time interval 240 that is equal to (or slightly less than) the time interval 205+the additional margin 225-T3. Other embodiments of the broadcast manager generate messages that indicate a value of a clock time that corresponds to the transmission time. In these embodiments, the user equipment schedules a wake-up time prior to the value of the clock time.

Figure 3:
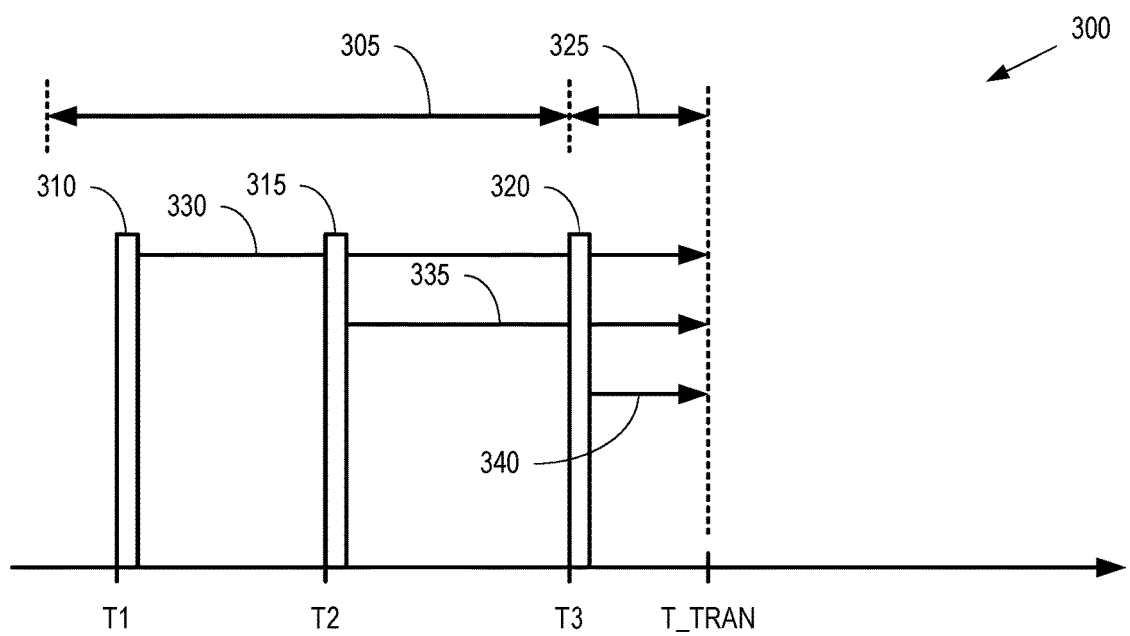
FIG. 3 is a diagram that illustrates paging windows in a time interval that corresponds to a latest paging window from among user equipment in a group of user equipment according to some embodiments.

FIG. 3 is a diagram 300 that illustrates paging windows in a time interval 305 that corresponds to a latest paging window from among user equipment in a group of user equipment according to some embodiments. The horizontal axis illustrates time in arbitrary units increasing from left to right. The group of user equipment includes three user equipment that have discontinuous reception cycles of different durations and different paging windows. A broadcast manager such as the broadcast manager 155 shown in FIG. 1 determines the timing of the paging window 320 for the user equipment using information stored by (or accessible to) an MME such as the MME 150 shown in FIG. 1. The broadcast manager can then set the time interval 305 based on a time that will elapse before a latest paging window from among the paging windows of the plurality of user equipment, which in this case is the paging window 320 at the time T3. Setting the time interval 305 based on the latest paging window from among the user equipment in the group of user equipment ensures that each user equipment has a paging window within the time interval 305, while also reducing the time that the user equipment wait for the broadcast or multicast transmission to a minimum. For example, the transmission time indicated in FIG. 3 is earlier than the transmission time indicated in FIG. 2. However, setting the time interval 305 based on the times of the paging windows incurs additional overhead for accessing and processing the timing information for the individual user equipment, which can become significant as a number of user equipment receiving the broadcast or multicast transmission increases.

The broadcast manager generates paging messages for transmission to all of the user equipment during their corresponding paging windows within the time interval 305. For example, the broadcast manager generates a first paging message for transmission to a first user equipment during the paging window 310 at the time T1 within the time interval 305, the broadcast manager generates a second paging message for transmission to a second user equipment during the paging window 315 at the time T2, and the broadcast manager generates a third paging message for transmission to a third user equipment during the paging window 320 at the time T3. User equipment that successfully receive the messages can respond with corresponding confirmation messages.

The paging messages transmitted to the user equipment include information that indicates a transmission time (T_TRAN) for a broadcast or multicast transmission to the user equipment. The transmission time is set to a time subsequent to the time interval 305 and, in some variations, a additional margin 325 is added to the transmission time. As discussed herein, the additional margin 325 can be determined based on various criteria. The transmission time or the additional margin 325 can also be negotiated between entities in the communication system. As also discussed herein, the broadcast manager can generate messages including a relative time between the paging window and the transmission time. For example, the broadcast manager can generate a first message that instructs the first user equipment to wake up after a first time interval 330 that is equal to (or slightly less than) the time interval 305+the additional margin 325-T1, a second message that instructs the second user equipment to wake up after a second time interval 335 that is equal to (or slightly less than) the time interval 305+the additional margin 325-T2, and a third message that instructs the third user equipment to wake up after a third time interval 340 that is equal to (or slightly less than) the time interval 305+the additional margin 325-T3. In the illustrated embodiment, the time interval 305 is substantially equal to T3, so the third time interval 340 is substantially equal to the additional margin 325. Other embodiments of the broadcast manager generate messages that indicate a value of a clock time that corresponds to the transmission time. In these embodiments, the user equipment schedules a wake-up time prior to the value of the clock time.

Figure 4:
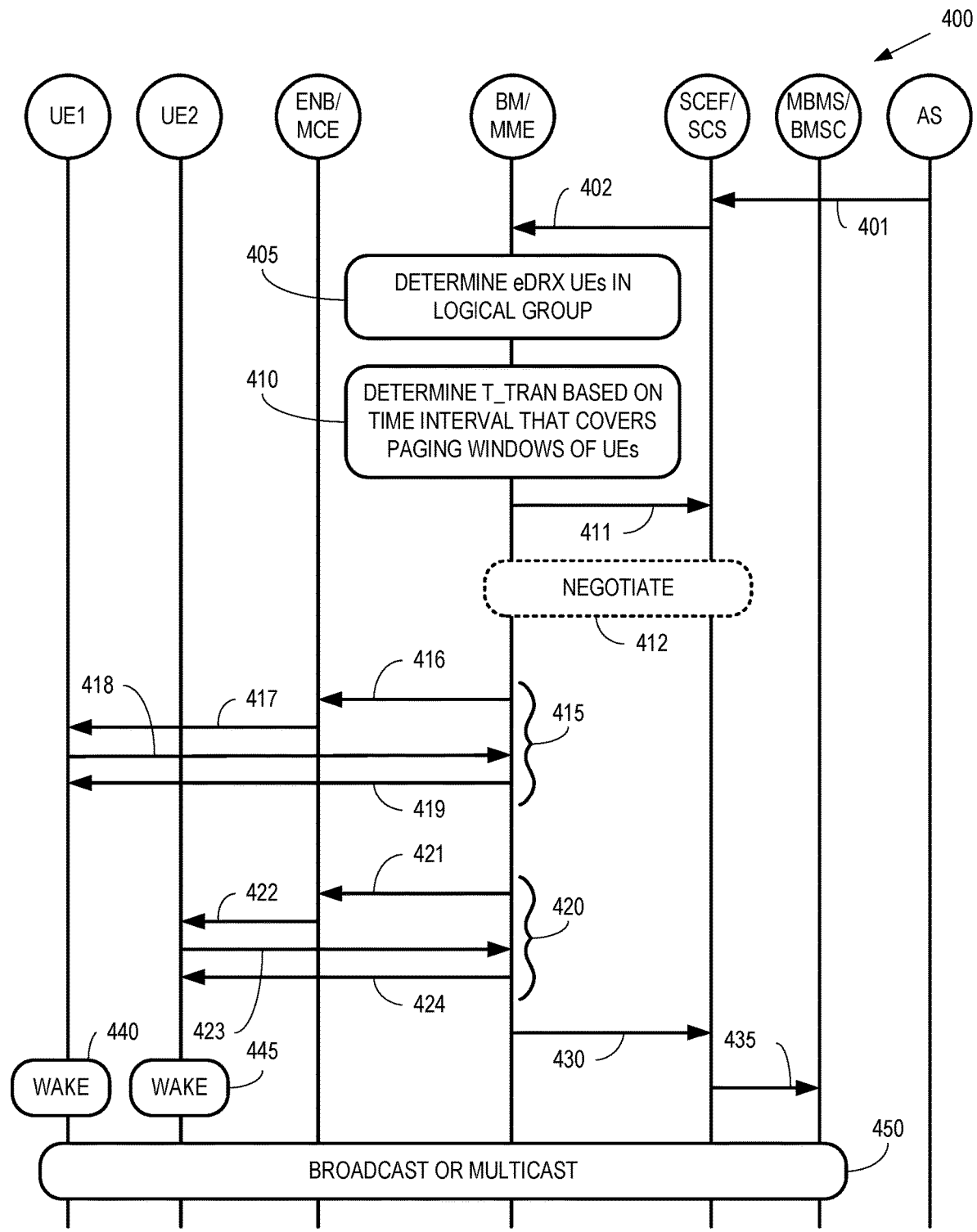
FIG. 4 illustrates a message flow that is used to instruct user equipment that operate in a discontinuous reception mode to wake up to receive broadcast or multicast messages after a time interval that encompasses paging windows of the user equipment according to some embodiments.

FIG. 4 illustrates a message flow 400 that is used to instruct user equipment that operate in a discontinuous reception mode to wake up to receive broadcast or multicast messages after a time interval that encompasses paging windows of the user equipment according to some embodiments. The message flow 400 illustrates messages that are exchanged between entities in a wireless communication system including user equipment (UE1, UE2), a base station and multi-cell coordination entity (eNB/MCE), a broadcast manager and MME (BM/MME), an SCEF and SCS, an MBMS and BMSC, and an application server (AS). The message flow 400 therefore illustrates messages that are exchanged between entities in some embodiments of the wireless communication system 100 shown in FIG. 1.

The application server sends broadcast or multicast data to the SCEF at arrow 401. The application server can also send information indicating characteristics of the data such as an indication of whether the data is delay tolerant or delay intolerant, as well as a logical group identifier that indicates the group of user equipment that is to receive the broadcast or multicast data. In some embodiments, the application server also sends information indicating a specific transmission time for the broadcast or multicast data. The requested transmission time should be longer than the time interval that encompasses the paging windows of the user equipment in the group so that the user equipment can be informed of the transmission time prior to the broadcast or multicast transmission.

In response to receiving the broadcast or multicast data (and any other accompanying information), the SCEF transmits (at arrow 402) a message to the MME including information indicating the identifier of the logical group of the user equipment. This information can be used by the MME to determine if a broadcast or multicast mechanism can be used to send the data to the user equipment.

At block 405, the MME identifies the user equipment associated with the logical group. For example, the MME can include a table that is indexed by the logical group identifier and includes identifiers of the user equipment in the logical group. The MME can also determine that the user equipment in the logical group are operating in a discontinuous reception mode. The durations of the discontinuous reception cycles and the timing of the paging windows are also determined for the user equipment in the logical group, e.g., based on information stored by the MME or accessible to the MME.

At block 410, the broadcast manager computes a transmission time (T_TRAN) for the broadcast or multicast data. The broadcast manager computes the transmission time based on a time interval that encompasses the paging windows for the user equipment in the logical group. If all of the user equipment in the logical grouping share the same discontinuous reception cycle, then the time interval that encompasses the paging windows is equal to the duration of the shared discontinuous reception cycle. If the user equipment in the logical grouping have different discontinuous reception cycles, the time interval that encompasses the paging windows can be determined based on the longest duration of a discontinuous reception cycle of one of the user equipment in the logical grouping or the latest paging window from among the user equipment in the logical grouping, as discussed herein with regard to FIG. 2 and FIG. 3.

At arrow 411, the broadcast manager sends a message to the SCEF indicating the transmission time for the broadcast or multicast data. For example, if a request from the SCEF is for a broadcast and the MME computes a time at which all the user equipment can be reached, as discussed herein, the broadcast manager implemented in (or associated with) the MME sends a message indicating that broadcast data will be sent out a later time, which is indicated as a Cause parameter in the message transmitted at arrow 411. Alternatively, or additionally, the transmission time can be sent to application server or service capability server. The broadcast data can be transmitted as non-IP data using non-IP data delivery (NIDD). A message indicating that broadcast data is to be sent out a later time using a Cause parameter may be a NIDD Submit Response message.

Some embodiments of the message flow 400 include an optional block 412 that represents negotiation performed between the broadcast manager or MME and the SCEF. The negotiation can include exchanging messages to propose, modify, reject, or accept transmission times based on criteria established at the broadcast manager, the MME, the SCEF, or other entities such as the application server. Thus, the original transmission time determined by the broadcast manager can be modified or updated based on the results of the negotiation prior to informing the user equipment of the transmission time. Negotiation can also be performed at other points in the message flow 400, e.g., to decide whether to continue with a broadcast or multicast transmission based on a number of user equipment that respond to paging messages.

Prior to or during a paging window 415 for UE1, the MME transmits (at arrow 416) a paging message to the base station for transmission to UE1 during the paging window 415. At arrow 417, the base station transmits the paging message to the UE1 during the paging window 415. At arrow 418, the UE1 transmits a service request or paging response to the MME and broadcast manager via the base station to indicate that the UE1 successfully received the paging message. In response to receiving the service request or paging response, the MME and the base station transmit (at arrow 419) a service announcement to the UE1, e.g., using short message service (SMS) mechanisms. The service announcement includes information indicating the transmission time of the broadcast or multicast data and instructing the UE1 to wake up prior to this transmission time to receive the broadcast or multicast data. As discussed herein, the information indicating the transmission time can indicate a transmission time relative to the paging window 415 or a value of a clock time that indicates the transmission time. Reception of the transmission time can cause the respective UE1 to wake up an additional time in addition to waking up during the paging window 415 of the discontinuous reception cycle of UE1, i.e. the transmission time occurs at a time outside the paging window. Typically, the transmission time does not disturb the discontinuous reception cycle.

Prior to or during a paging window 420 for UE2, the MME transmits (at arrow 421) a paging message to the base station for transmission to UE2 during the paging window 420. At arrow 422, the base station transmits the paging message to the UE2 during the paging window 420. At arrow 423, the UE2 transmits a service request or paging response to the MME and broadcast manager via the base station to indicate that the UE2 successfully received the paging message. In response to receiving the service request or paging response, the MME and the base station transmits (at arrow 424) a service announcement to the UE2, e.g., using short message service (SMS) mechanisms. The service announcement includes information indicating the transmission time of the broadcast or multicast data and instructing the UE2 to wake up prior to this transmission time to receive the broadcast or multicast data. As discussed herein, the information indicating the transmission time can indicate a transmission time relative to the paging window 420 or a value of a clock time that indicates the transmission time.

At arrow 430, the broadcast manager or MME transmits a message to the SCEF indicating the success or failure of each attempt to page the user equipment. For example, if the MME was not able to initiate or successfully complete a paging process for any of the user equipment and the broadcast or multicast group, the MME can transmit an NIDD message towards the SCEF including a list of user equipment that the MME failed to page. Although a single message is shown in FIG. 4, individual messages indicating success or failure of attempts to reach individual user equipment can be transmitted to the SCEF. This information can be conveyed to the application server, which can use this information to determine whether to perform retransmission of the broadcast or multicast data at a subsequent time. In some variations, the broadcast manager or MME transmits a summary message indicating a number of user equipment that were paged and a number (or percentage) of the user equipment that responded to the paging messages.

At arrow 435, the SCEF initiates a request to the BMSC/MBMS to transmit the broadcast or multicast data at the transmission time. The BMSC/MBMS can initiate the broadcast or multicast of the data by transmitting a message such as a MBMS session start request message to the MME.

At a predetermined time prior to the transmission time, UE1 and UE2 (as well as any other user equipment that are receiving the broadcast or multicast data) wake up at blocks 440, 445, respectively. The predetermined time can be established based on a latency required for the UE1 or UE2 to transition from an idle or sleep mode into an active or connected mode in which the UE1 or UE2 are able to receive the broadcast or multicast data. The user equipment can also determine a time interval to remain awake or connected to receive the broadcast or multicast data.

At block 450, the BMSC/MBMS broadcasts or multicasts the data received from the application server to UE1, UE2, and any other user equipment and the logical grouping that includes UE1 and UE2.

Figure 5:
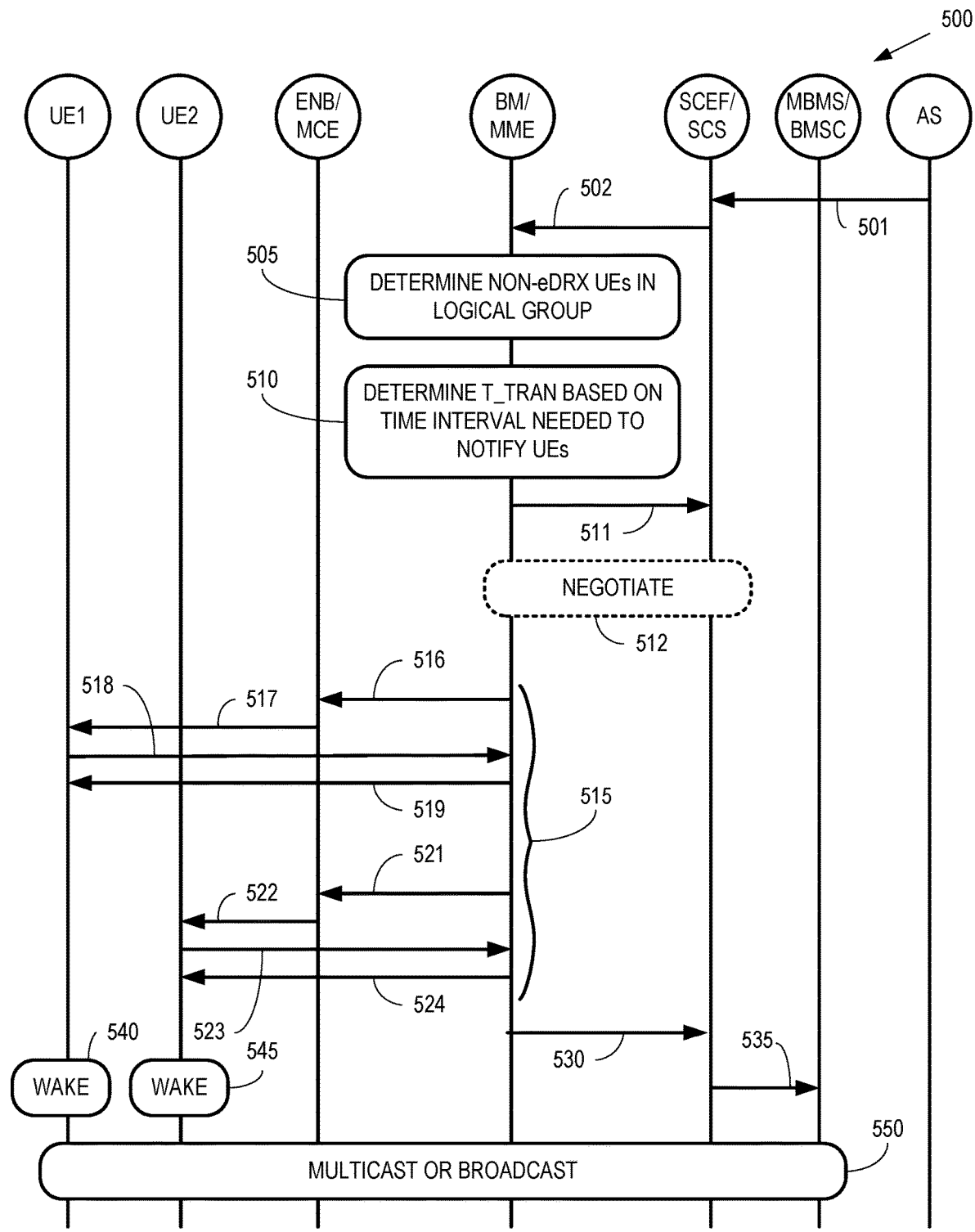
FIG. 5 illustrates a message flow that is used to instruct user equipment that are not operating in a discontinuous reception mode to wake up to receive broadcast or multicast messages according to some embodiments.

FIG. 5 illustrates a message flow 500 that is used to instruct user equipment that are not operating in a discontinuous reception mode to wake up to receive broadcast or multicast messages according to some embodiments. The message flow 500 illustrates messages that are exchanged between entities in a wireless communication system including user equipment (UE1, UE2), a base station and multi-cell coordination entity (eNB/MCE), a broadcast manager and MME (BM/MME), an SCEF and SCS, an MBMS and BMSC, and an application server (AS). The message flow 500 therefore illustrates messages that are exchanged between entities in some embodiments of the wireless communication system 100 shown in FIG. 1.

The application server sends broadcast or multicast data to the SCEF at arrow 501. The application server can also send information indicating characteristics of the data such as an indication of whether the data is delay tolerant or delay intolerant, as well as a logical group identifier that indicates the group of user equipment that is to receive the broadcast or multicast data. In some embodiments, the application server also sends information indicating a specific transmission time for the broadcast or multicast data. The requested transmission time should be longer than a time interval needed to inform UE1 and UE2 (as well as any other user equipment that are not specifically illustrated in FIG. 5) of the transmission time prior to the broadcast or multicast transmission.

In response to receiving the broadcast or multicast data (and any other accompanying information), the SCEF transmits (at arrow 502) a message to the MME including information indicating the identifier of the logical group of the user equipment. This information can be used by the MME to determine if a broadcast or multicast mechanism can be used to send the data to the user equipment.

At block 505, the MME identifies the user equipment associated with the logical group. For example, the MME can include a table that is indexed by the logical group identifier and includes identifiers of the user equipment in the logical group. The MME can also determine that the user equipment in the logical group are not operating in a discontinuous reception mode. Paging messages are not constrained to transmission during paging windows defined by a discontinuous reception cycle for the user equipment that are not operating in the discontinuous reception mode.

At block 510, the broadcast manager computes a transmission time (T_TRAN) for the broadcast or multicast data. The broadcast manager computes the transmission time based on a time interval that is needed to page the user equipment in the logical group. If the application server did not transmit or request a specific transmission time, the broadcast manager calculates the transmission time based on the amount of time required to send notifications to user equipment that are awake or connected (e.g., in an active mode) or user equipment that are idle or sleeping (e.g., in an inactive mode). The broadcast manager can determine the time required to send the notifications based on estimates of the pacing of transmission of individual notifications. The pacing can represent a rate of transmitting the individual notifications without exceeding a threshold loading that would degrade performance of the network.

At arrow 511, the broadcast manager sends a message to the SCEF indicating the transmission time for the broadcast or multicast data. For example, if a request from the SCEF is for a broadcast and the MME computes a time at which all the user equipment can be reached, as discussed herein, the broadcast manager implemented in (or associated with) the MME sends a message indicating that broadcast data will be sent out a later time, which is indicated as a Cause parameter in the message transmitted at arrow 511. Alternatively, or additionally, the transmission time can be sent to application server or service capability server. The broadcast data can be transmitted as non-IP data using NIDD. A message indicating that broadcast data is to be sent out a later time using a Cause parameter may be a NIDD Submit Response message.

Some embodiments of the message flow 500 include an optional block 512 that represents negotiation performed between the broadcast manager or MME and the SCEF. The negotiation can include exchanging messages to propose, modify, reject, or accept transmission times based on criteria established at the broadcast manager, the MME, the SCEF, or other entities such as the application server. Thus, the original transmission time determined by the broadcast manager can be modified or updated based on the results of the negotiation prior to informing the user equipment of the transmission time. Negotiation can also be performed at other points in the message flow 500, e.g., to decide whether to continue with a broadcast or multicast transmission based on a number of user equipment that respond to paging messages.

As discussed above, the broadcast manager determines a time interval that represents a paging interval 515 that is needed to notify UE1 and UE2 (as well as other user equipment) of the upcoming broadcast or multicast. Prior to or during the paging window 515, the MME transmits (at arrow 516) a paging message to the base station for transmission to UE1 during the paging window 515. At arrow 517, the base station transmits the paging message to the UE1 during the paging window 515. At arrow 518, the UE1 transmits a service request or paging response to the MME and broadcast manager via the base station to indicate that the UE1 successfully received the paging message. In some cases, the UE1 is already in a connected mode, in which case transmission of the paging request (at arrow 517) and the service request or paging response (at arrow 518) are bypassed. In response to receiving the service request or paging response, the MME and the base station transmit (at arrow 519) a service announcement to the UE1, e.g., using short message service (SMS) mechanisms. The service announcement includes information indicating the transmission time of the broadcast or multicast data and instructing the UE1 to wake up prior to this transmission time to receive the broadcast or multicast data. As discussed herein, the information indicating the transmission time can indicate a transmission time relative to a reference time such as transmission of the paging message or a value of a clock time that indicates the transmission time. Reception of information indicating the transmission time can cause the respective UE1 to wake up an additional time in addition to waking up during the paging window of the discontinuous reception cycle of UE1, i.e. the transmission time occurs at a time outside the paging window. Typically, the transmission time does not disturb the discontinuous reception cycle.

Prior to or during the paging window 515, the MME also transmits (at arrow 521) a paging message to the base station for transmission to UE2 during the paging window 515. At arrow 522, the base station transmits the paging message to the UE2 during the paging window 515. At arrow 523, the UE2 transmits a service request or paging response to the MME and broadcast manager via the base station to indicate that the UE2 successfully received the paging message. In some cases, the UE2 is already in a connected mode, in which case transmission of the paging request (at arrow 522) and the service request or paging response (at arrow 523) are bypassed. In response to receiving the service request or paging response, the MME and the base station transmit (at arrow 524) a service announcement to the UE2, e.g., using short message service (SMS) mechanisms. The service announcement includes information indicating the transmission time of the broadcast or multicast data and instructing the UE2 to wake up prior to this transmission time to receive the broadcast or multicast data. As discussed herein, the information indicating the transmission time can indicate a transmission time relative to a reference time such as transmission of the paging message or a value of a clock time that indicates the transmission time.

At arrow 530, the broadcast manager or MME transmits a message to the SCEF indicating the success or failure of each attempt to page the user equipment. For example, if the MME was not able to initiate or successfully complete a paging process for any of the user equipment and the broadcast or multicast group, the MME can transmit an NIDD message towards the SCEF including a list of user equipment that the MME failed to page. Although a single message is shown in FIG. 5, individual messages indicating success or failure of attempts to reach individual user equipment can be transmitted to the SCEF. This information can be conveyed to the application server, which can use this information to determine whether to perform retransmission of the broadcast or multicast data at a subsequent time.

At arrow 535, the SCEF initiates a request to the BMSC/MBMS to transmit the broadcast or multicast data at the transmission time. The BMSC/MBMS can initiate the broadcast or multicast of the data by transmitting a message such as a MBMS session start request message to the MME.

At a predetermined time prior to the transmission time, UE1 and UE2 (as well as any other user equipment that are receiving the broadcast or multicast data) wake up at blocks 540, 545. The predetermined time can be established based on a latency required for the UE1 or UE2 to transition from an idle or sleep mode into an active mode in which the UE1 or UE2 are able to receive the broadcast or multicast data. The user equipment can also determine a time interval to remain awake to receive the broadcast or multicast data.

At block 550, the BMSC/MBMS broadcasts or multicasts the data received from the application server to UE1, UE2, and any other user equipment and the logical grouping that includes UE1 and UE2.

Figure 6:
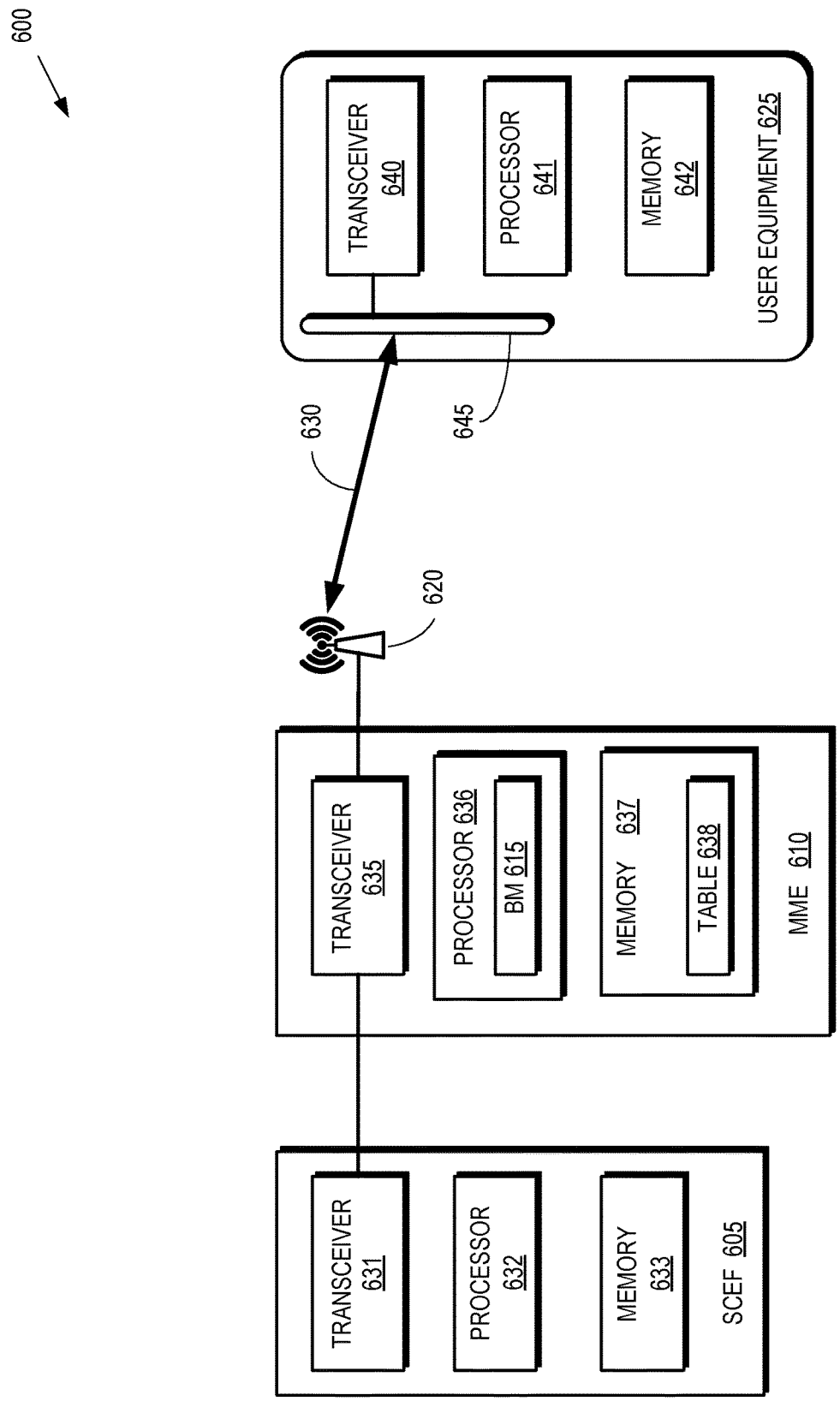
FIG. 6 is a block diagram of a wireless communication system that supports the use of paging messages to notify user equipment of upcoming broadcast or multicast transmissions according to some embodiments.

FIG. 6 is a block diagram of a wireless communication system 600 that supports the use of paging messages to notify user equipment of upcoming broadcast or multicast transmissions according to some embodiments. The communication system 600 implements an SCEF 605, an MME 610 that includes an embedded broadcast manager 615, a base station 620, and user equipment 625. Although the broadcast manager 615 is illustrated as embedded in the MME 610, some embodiments of the broadcast manager 615 are implemented external to the MME 610 and connected to the MME 610 by an interface. Furthermore, in some variations, the broadcast manager 615 can be represented as software stored in the memory 637 and executed by the processor 636. The base station 620 exchanges messages or signaling with the user equipment 625 over an air interface 630. The communication system 600 can therefore be used to implement some embodiments of the wireless communication system 100 shown in FIG. 1.

The SCEF 605 includes a transceiver 631 for transmitting and receiving signals. The transceiver 631 can be implemented as a single integrated circuit (e.g., using a single ASIC or FPGA) or as a system-on-a-chip (SOC) that includes different modules for implementing the functionality of the transceiver 631. The SCEF 605 also includes a processor 632 and a memory 633. The processor 632 can be used to execute instructions stored in the memory 633 and to store information in the memory 633 such as the results of the executed instructions. The transceiver 631, the processor 632, and the memory 633 can therefore be configured to implement some portions of the message flow 400 shown in FIG. 4 and the message flow 500 shown in FIG. 5.

The MME 610 includes a transceiver 635 for transmitting and receiving signals. The transceiver 635 can be implemented as a single integrated circuit (e.g., using a single ASIC or FPGA) or as a system-on-a-chip (SOC) that includes different modules for implementing the functionality of the transceiver 635. The MME 610 also includes a processor 636 and a memory 637. The processor 636 can be used to execute instructions stored in the memory 637 and to store information in the memory 637 such as the results of the executed instructions. The processor 636 is also configured to implement the embedded broadcast manager 615. The memory 637 includes a data structure such as a table 638 for storing information associated with user equipment in different logical groupings, such as group identifiers, user equipment identifiers, discontinuous reception mode statuses, discontinuous reception mode cycle times, paging windows, and the like. The transceiver 635, the processor 636, and the memory 637 can therefore be configured to implement some portions of the message flow 400 shown in FIG. 4 and the message flow 500 shown in FIG. 5.

The user equipment 625 includes a transceiver 640 for transmitting and receiving signals. The transceiver 640 is coupled to an antenna 645 and can be implemented as a single integrated circuit (e.g., using a single ASIC or FPGA) or as a system-on-a-chip (SOC) that includes different modules for implementing the functionality of the transceiver 640. The user equipment 625 also includes a processor 641 and a memory 642. The processor 641 can be used to execute instructions stored in the memory 642 and to store information in the memory 642 such as the results of the executed instructions. The transceiver 640, the processor 641, and the memory 642 can therefore be configured to implement some portions of the message flow 400 shown in FIG. 4 and the message flow 500 shown in FIG. 5.

At least parts of the above described wireless communication system 600 including one or more base stations such as the base station 620 could be implemented using network function virtualization (NFV). NFV is a network architecture that makes use of technologies of computer virtualization. Entire network equipment like the base station 620, the MME 610, the broadcast manager 615, the SCEF 605, or parts thereof or part of their functions can be virtualized using software building blocks that may connect, or interact, to create communication services. A virtualized network function of, e.g., the broadcast manager 615 can include at least one virtual machine running different software and processes, on top of standard high-volume servers, switches and storage, or a cloud computing infrastructure, instead of having customized hardware appliances for each network function. As such one or more functions of the broadcast manager 615 can be implemented using a computer program product embodied on a non-transitory computer readable medium for performing operations, wherein the computer program product comprises instructions, that when executed by a processor, perform the operations of the specific base station function.

Figure 7:
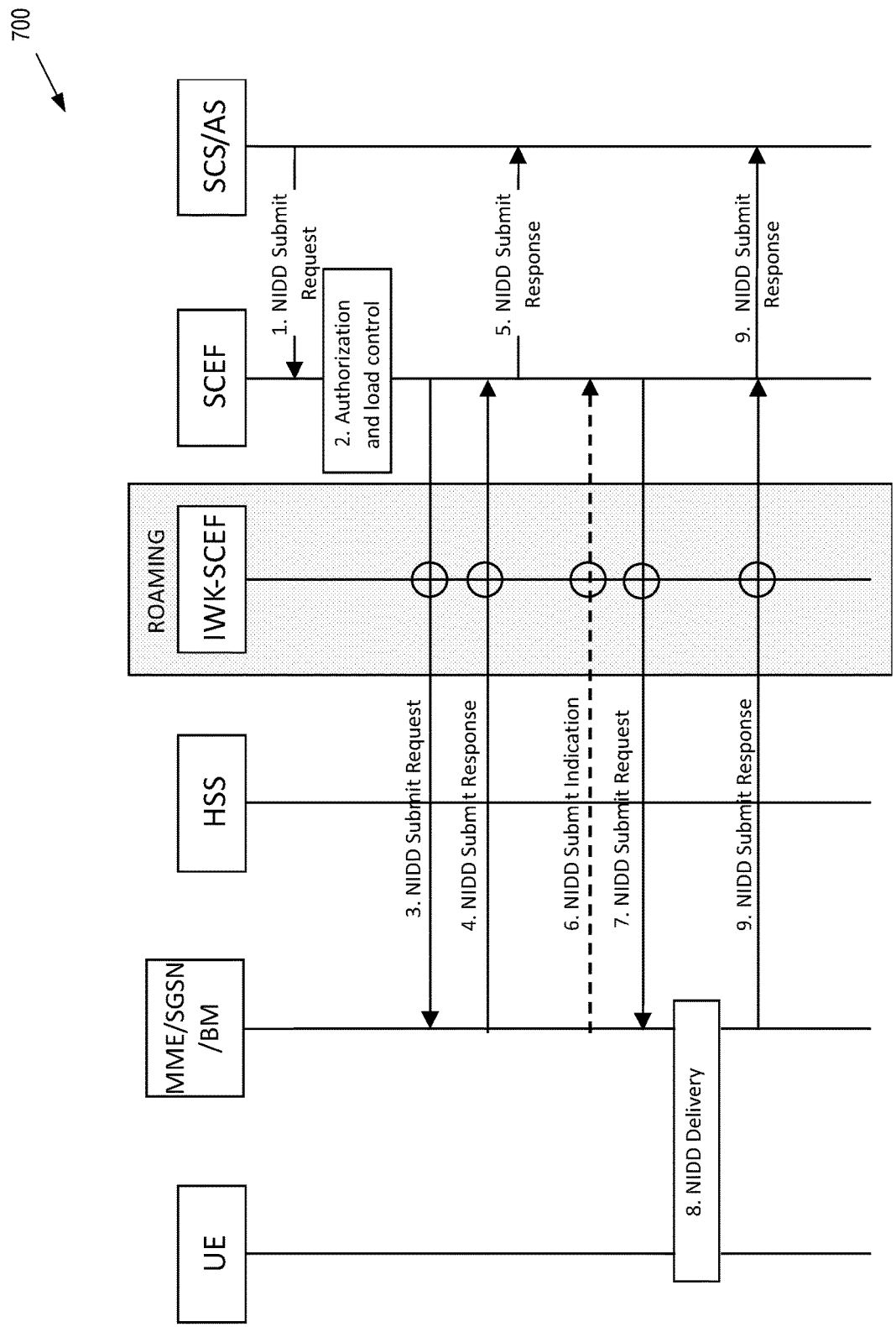
FIG. 7 is a diagram of a message flow 700 using non-IP data delivery (NIDD) according to some embodiments.

FIG. 7 is a diagram of a message flow 700 using non-IP data delivery (NIDD) according to some embodiments. The message flows 700 illustrates the procedure using which the SCS/AS sends non-IP data to a given user as identified via External Identifier or MSISDN. Some aspects of the message flow correspond to standards set forth in section 5.13.3 of 3GPP Technical Specification 23.682 V14.0.0 (2016-06)), which is incorporated herein by reference in its entirety. The message flows 700 assumes that procedures in clause 5.13.1 of 3GPP Technical Specification 23.682 is completed.

1. If SCS/AS has already activated the NIDD service for a given UE, and has downlink non-IP data to send to the UE, the SCS/AS sends a NIDD Submit Request (External Identifier or MSISDN, SCS/AS Reference ID, non-IP data) message to the SCEF.

2. If an SCEF EPS bearer context corresponding to the External Identifier or MSISDN included in step 1 is found, then the SCEF checks whether the SCS/AS is authorised to send NIDD requests and that the SCS has not exceeded its quota (e.g. 200 bytes in 24 hrs) or rate (e.g. 10 bytes/hour) of data submission. If this check fails, the SCEF sends a NIDD Response with a cause value indicating the reason for the failure condition and the flow stops at this step. Otherwise, the flow continues with step 3.

If no SCEF EPS bearer context is found, then the SCEF, depending on configuration, may either:

send a NIDD response with appropriate error cause value. The flow stops at this step; Or perform device triggering towards the UE (using T4 SMS trigger, refer to clause 5.2.2 of 3GPP 23.682) to establish a Non-IP PDN connection towards the SCEF. In this case, step 6 with an appropriate cause value is executed; or accept the NIDD Submit Request, and execute step 6 with an appropriate cause value, and wait for the UE to perform a procedure (see TS 23.401) causing the establishment of a PDN connection to the SCEF (see clause 5.13.1.2 of 3GPP 23.682).

NOTE 2: The duration for which the SCEF may wait for establishment of a PDN connection to the SCEF for the given UE is implementation dependent.

3. If an SCEF EPS bearer context corresponding to the External Identifier or MSISDN included in step 1 is found, then the SCEF sends a NIDD Submit Request (User Identity, EPS Bearer ID, SCEF ID, non-IP data) message toward the MME/SGSN.

If the IWK-SCEF receives a NIDD Submit Request message from the SCEF, it relays the message to the MME/SGSN.

4. If the MME/SGSN/BM can immediately deliver the non-IP data to the UE e.g. when UE is already in ECM_CONNECTED mode, or UE is in ECM_IDLE and MME/SGSN is able to initiate paging procedure (see TS 23.401), the procedure proceeds at step 8. If the request from SCEF is for broadcast then the MME/SGSN/BM compute the time (T) by which all UEs can be reached and send a NIDD Submit Response (Cause, Reachable for NIDD, T) message towards the SCEF. The Cause parameter indicates the broadcast data will be sent at a later time T. Additionally, the UEs are informed about the time T, e.g. via a paging procedure if a UE is in ECM_IDLE or immediately when a UE is already in ECM_CONNECTED.

If the MME/SGSN is aware of the UE being unreachable while using power saving functions e.g. UE Power Saving Mode (see clause 4.5.4 of 3GPP 23.682) or extended idle mode DRX (see clause 4.5.13 of 3GPP 23.682), then MME/SGSN sends a NIDD Submit Response (Cause, Reachable for NIDD) message towards the SCEF. The Cause parameter indicates that Non-IP data was not delivered to the UE. The Reachable for NIDD flag indicates that the MME/SGSN will notify the SCEF when the MME/SGSN determines the UE is reachable. The MME/SGSN stores Reachable for NIDD flag in the EMM context for this UE.

5. The SCEF may send a NIDD Response to the SCS/AS informing of the received results from the MME/SGSN. If the SCEF receives the Reachable for NIDD flag from the MME/SGSN, the SCEF can buffer the non-IP data requested at step 3 based on the configuration.

6. When the MME/SGSN detects that the UE is reachable (e.g. when coming out of PSM mode by performing TAU, when initiating MO communication etc), or when the UE is about to become reachable (e.g. extended idle mode DRX cycle expiring, MME/SGSN anticipating MO communication pattern for the UE etc), and the MME/SGSN has the Reachable for NIDD flag set, then the MME/SGSN sends a NIDD Submit Indication (User Identity) message towards the SCEF. The MME/SGSN clears the Reachable for NIDD flag from its EMM context.

7. The SCEF sends a NIDD Submit Request (User Identity, EPS Bearer ID, SCEF ID, non-IP data) message toward the MME/SGSN.

8. If required, the MME/SGSN pages the UE and delivers the non-IP data to the UE using data transfer via the MME/SGSN procedure as described in clause 5.3.4B.3 of TS 23.401. If the non-IP data is provided via broadcast, the non-IP data is delivered to the UEs at time T. Depending on operator configuration, the MME/SGSN may generate the necessary accounting information required for charging.

9. If the MME/SGSN was able to initiate step 8, then the MME/SGSN sends a NIDD Submit Response (cause) message towards the SCEF acknowledging the NIDD Submit Request from SCEF received in step 3 or step 7. The SCEF confirms the non-IP data transfer towards the SCS/AS. If the MME/SGSN was not able to initiate step 8 for any member of the UEs in the group requested for broadcast, then the MME/SGSN sends a NIDD Submit Response (cause) message towards the SCEF with the list of UEs that it failed to page.

NOTE 3: The successful result does not imply the data is successfully received at the UE, but just the MME/SGSN has sent the non-IP data in NAS signalling to the UE.

In some embodiments, certain aspects of the techniques described above can be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    identifying, at a broadcast manager, a first time interval that encompasses paging windows of different durations for a plurality of narrowband Internet-of-Things (NB-IoT) user equipment, wherein the plurality of NB-IoT user equipment operate according to a plurality of different discontinuous reception cycles that include sleep intervals of different durations separated by the paging windows; and
    generating, at the broadcast manager, messages for wireless transmission to the plurality of NB-IoT user equipment in the paging windows during the first time interval, wherein the messages include information indicating a transmission time at which the plurality of NB-IoT user equipment are to receive at least one of broadcast and multicast data in a non Internet Protocol (non-IP) data delivery (NIDD), wherein the transmission time is subsequent to the first time interval, wherein the messages including information indicating the transmission time comprise a NIDD Submit Response message.

2. The method of claim 1, further comprising, at the broadcast manager, sending the transmission time to at least one of a service capability server, a service compatibility exposure function, and an application server.

3. The method of claim 1, further comprising, at the broadcast manager, computing the transmission time.

4. The method of claim 1, further comprising:
    determining, at the broadcast manager, that the plurality of NB-IoT user equipment are members of a logical grouping indicated by a group identifier.

5. The method of claim 1, wherein identifying the first time interval that encompasses the paging windows comprises at least one of:
    identifying a first time interval that is equal to or greater than a longest discontinuous reception cycle of the plurality of different discontinuous reception cycles; or
    identifying a first time interval based on an amount of time that will elapse before a latest paging window from among the paging windows of the plurality of NB-IoT user equipment.

6. The method of claim 1, wherein generating the messages comprises at least one of:

generating messages including information indicating a plurality of second time intervals equal to differences between the paging windows and the transmission time;

generating messages include information indicating the plurality of second time intervals plus a margin time interval; or generating messages including information indicating a clock time that is equal to the transmission time.

7. The method of claim 1, further comprising:

subdividing the plurality of NB-IoT user equipment into subsets;

identifying first time intervals that encompass different paging windows for the subsets; and generating messages for wireless transmission to the subsets in the different paging windows during the first time intervals, wherein the messages include information indicating different transmission times at which the subsets are to wake up to receive information that is broadcast or multicast to the subsets.

8. The method of claim 1, further comprising:

negotiating the transmission time with at least one of a service capability server, a service compatibility exposure function, and an application server.

9. A non-transitory computer readable medium embodying a set of executable instructions, the set of executable instructions to manipulate at least one processor to:

identify a first time interval that encompasses paging windows for a plurality of narrowband Internet-of-Things (NB-IoT) user equipment, wherein the plurality of NB-IoT user equipment operate according to a plurality of different discontinuous reception cycles that include sleep intervals of different durations separated by the paging windows of different durations; and generate messages for wireless transmission to the plurality of NB-IoT user equipment in the paging windows during the first time interval, wherein the messages include information indicating a transmission time at which the plurality of NB-IoT user equipment are to receive at least one of broadcast and multicast data in a non Internet Protocol (non-IP) data delivery (NIDD), wherein the transmission time is subsequent to the first time interval, wherein the messages including information indicating the transmission time comprise a NIDD Submit Response message.

10. The non-transitory computer readable medium of claim 9, wherein the set of executable instructions further is to manipulate the at least one processor to compute the transmission time.

11. The non-transitory computer readable medium of claim 9, wherein the set of executable instructions is to manipulate the at least one processor to identify a first time interval that is equal to or greater than a longest discontinuous reception cycle of the plurality of different discontinuous reception cycles or to manipulate the at least one processor to identify a first time interval based on an amount of time that will elapse before a latest paging window from among the paging windows of the plurality of NB-IoT user equipment.

* * * * *